United States Patent
Chien et al.

(10) Patent No.: US 8,139,884 B2
(45) Date of Patent: Mar. 20, 2012

(54) BLUR IMAGE ADJUSTING METHOD

(75) Inventors: Yen-Lung Chien, Taipei (TW);
Chih-Tsung Shen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 795 days.

(21) Appl. No.: 12/238,513

(22) Filed: Sep. 26, 2008

(65) Prior Publication Data
US 2009/0190851 A1 Jul. 30, 2009

Related U.S. Application Data

(60) Provisional application No. 61/023,104, filed on Jan. 24, 2008.

(51) Int. Cl.
*G06K 9/38* (2006.01)
*G06K 9/40* (2006.01)

(52) U.S. Cl. ......... 382/255; 382/254; 382/260; 382/271

(58) Field of Classification Search .................. None
See application file for complete search history.

(56) References Cited

U.S. PATENT DOCUMENTS

| | | | |
|---|---|---|---|
| 7,260,270 B2 * | 8/2007 | Kusaka | 382/275 |
| 7,477,802 B2 * | 1/2009 | Milanfar et al. | 382/299 |
| 7,519,231 B2 * | 4/2009 | Li et al. | 382/264 |
| 7,616,826 B2 * | 11/2009 | Freeman et al. | 382/255 |
| 7,711,253 B2 * | 5/2010 | Tomita et al. | 396/53 |
| 2005/0019000 A1 * | 1/2005 | Lim et al. | 386/46 |
| 2006/0125938 A1 * | 6/2006 | Ben-Ezra et al. | 348/241 |
| 2007/0058073 A1 * | 3/2007 | Steinberg et al. | 348/362 |
| 2007/0098292 A1 * | 5/2007 | Batur | 382/261 |
| 2008/0013850 A1 * | 1/2008 | Sakurai et al. | 382/255 |
| 2008/0036900 A1 * | 2/2008 | Nakajima et al. | 348/345 |

OTHER PUBLICATIONS

Banham, M.R.; Katsaggelos, A.K.; "Digital image restoration", IEEE Signal Processing Magazine, 1997, vol. 14 Issue:2 on pp. 24-41.*

* cited by examiner

*Primary Examiner* — Samir Ahmed
*Assistant Examiner* — Li Liu
(74) *Attorney, Agent, or Firm* — Jianq Chyun IP Office

(57) ABSTRACT

A blur image adjusting method includes the following steps. Firstly, a blur image in YCbCr color space is obtained. The Y component of the blur image is extracted so as to obtain a Y component blur image. A blur area is extracted from the Y component blur image by an edge detection technology. A horizontal shift amount and a vertical shift amount are estimated according to a horizontal shift pixel number distribution and a vertical shift pixel number distribution of the blur area. A point spread function is determined according to the horizontal shift amount and the vertical shift amount. Afterwards, the blur image is adjusted according to the point spread function.

9 Claims, 6 Drawing Sheets

BLUR IMAGE ADJUSTING METHOD

CROSS REFERENCE TO RELATED PATENT APPLICATION

This patent application is based on a U.S. provisional patent application No. 61/023,104 filed on Jan. 24, 2008.

FIELD OF THE INVENTION

The present invention relates to a blur image adjusting method, and more particularly to a blur image adjusting method by using a point spread function.

BACKGROUND OF THE INVENTION

With increasing development of electronic industries, the current digital cameras usually have anti-vibration functions. Generally, there are several approaches of performing the anti-vibration functions.

A first approach is a mechanical anti-vibration function. A camera lens or a charge coupled device (CCD) of the digital camera is provided with a movable mechanism and a manual detecting device. In a case that the digital camera is slightly subject to vibration during the shooting period, the tiny vibration amount is detected by the manual detecting device. According to the vibration amount, a dynamically reverse compensation is performed on the camera lens or the CCD such that the location of the camera lens relative to the CCD is kept unchanged. By means of the mechanical anti-vibration function, the image captured by the CCD is not blurred. Although the mechanical anti-vibration function is effective for obtaining sharp imaged, there are still some drawbacks. For example, the mechanical structures of the components for performing the mechanical anti-vibration function are very complicated and costly. Consequently, the mechanical anti-vibration function is usually applied to high-level digital cameras.

A second approach uses a high ISO sensitivity setting or a super-high ISO sensitivity setting to perform the anti-vibration function. In a case that the digital camera is subject to vibration during the shooting period, the exposing time of the camera lens will be shortened. That is, an image is captured by the CCD within a very short time. This image is usually not blurred. Since the exposing time of the camera lens is very short, the intensity of the light received by the CCD is insufficient and the image signal generated by the CCD is considerably weak. For solving these drawbacks, the digital camera needs a built-in amplifying circuit to amplify the image signal into a sharp image. Generally, most commercial digital cameras use the second approach to achieve the anti-vibration purpose.

In accordance with the above two approaches, by mechanical means or exposing-time control, the images captured by the CCD when the digital camera is subject to vibration will not become blurred. In views of complexity and cost, the above two anti-vibration approaches are not feasible for the digital camera of a handheld device such as a mobile phone or a personal digital assistant (PDA). Under this circumstance, another processing method is required to process the blur image captured by the CCD of the digital camera of the handheld device into a sharp image.

FIG. 1A schematically illustrates a model of an image degradation/restoration process. A sharp image f(x,y) undergoes a degradation process to produce a blur image g(x,y). If the degradation function h(x,y) is a linear spatially invariant process and η(x,y) is noise, the blur image g(x,y) is given in the spatial domain by:

$$g(x,y) = h(x,y) \otimes (x,y) + \eta(x,y) \quad (1)$$

where the symbol ⊗ indicates convolution integration.

Via Fourier transformation, the equation (1) is given in the frequency domain by:

$$G(u,v) = H(u,v)F(u,v) + N(u,v) \quad (2)$$

where N(u,v) denotes the Fourier transformation of the noise, and the degradation function H(u,v) denotes an optical transfer function (OTF) in the frequency domain. The degradation function h(x,y) in the spatial domain is also referred as a point spread function (PSF). The point spread function (PSF) describes the response of h(x,y) to a point source so as to achieve the degradation process of any object.

FIG. 1B schematically illustrates a degradation process of an object. In a case that the noise is negligible in the spatial domain, a blur image 30 is the convolution of an object 10 and a point spread function 20.

When the degradation process of FIG. 1B is applied to a digital camera, the sharp image f(x,y) denotes the object to be shot and the point spread function h(x,y) denotes vibration of the digital camera. The blur image g(x,y) captured by the CCD corresponds to the convolution of f(x,y) and h(x,y) and the additive noise q(x,y). By means of the restoration filter shown in FIG. 1A, the blur image g(x,y) undergoes the restoration process so as to be restored to a sharp image f̂(x,y).

In a very simple manner, a direct inverse filter is used as a restoration filter to recover the sharp image from the blur image. That is, the equation (2) is divided by the degradation function H(u,v) in the frequency domain and expressed by:

$$\hat{F}(u,v) = F(u,v) + \frac{N(u,v)}{H(u,v)}. \quad (3)$$

The use of the direct inverse filter, however, still has a drawback. In a case the degradation function H(u,v) approaches zero, the noise is enlarged. Accordingly, the direct inverse filter is not feasible for image restoration.

As known, a Lucy-Richardson (LR) algorithm works surprisingly well when applied to the restoration filter. After a point spread function is obtained, the LR algorithm is performed to recover the sharp image from the blur image. Since the computation amount for the LR algorithm is very huge, even the state-of-the-art desktop computer processor takes about ten minutes or more to implement the LR algorithm. As a result, the LR algorithm is not feasible to be used in the handheld device.

In 1942, a Wiener filter was proposed for recovering the sharp image from the blur image. The purpose of the Wiener filter is to find the minimum mean square error on the basis of a statistical approach. The minimum mean square error of the output sharp image f̂(x,y) is expressed by:

$$e^2 = E\{(f - \hat{f})^2\} \quad (4)$$

where E is an expected value of the squared error, and f is the original image (object).

The solution of the equation is expressed by:

$$\hat{F}(u,v) = \left[ \frac{1}{H(u,v)} \frac{|H(u,v)|^2}{|H(u,v)|^2 + S_\eta(u,v)/S_f(u,v)} \right] G(u,v) \quad (5)$$

where degradation function H(u,v) denotes the Fourier transformation of the point spread function, $S_n(x,y)$ is a power spectrum of the noise, $S_f(u,v)$ is a power spectrum of the original image (object). Since the computation amount for the Wiener filter is relatively small, the Wiener filter is feasible to be used in the handheld device.

Generally, the quality of the output sharp image $\hat{f}(x,y)$ is dependent on the type of the restoration filter. For the handheld device, the ability of detecting the point spread function h(x,y) may also influence the quality of the output sharp image $\hat{f}(x,y)$. In other words, the mobile phone should have the ability of detecting vibration of the mobile phone and detecting the point spread function h(x,y) in order to implement the anti-vibration function of a digital camera. Under this circumstance, the point spread function is also referred as a blur kernel.

Conventionally, the handheld device has a G sensor for detecting the point spread function. During operation of the digital camera of the handheld device, the G sensor may sense the gravity change. The gravity change is integrated to compute the real displacement and obtain the point spread function. Afterwards, a sharp image is recovered from the blur image by means of the processor of the handheld device and the restoration filter. The G sensor, however, increases the fabricating cost of the handheld device.

Therefore, there is a need of providing a blur image adjusting method to obviate the drawbacks encountered from the prior art.

SUMMARY OF THE INVENTION

The present invention provides a blur image adjusting method by simply adjusting the blur image captured by the CCD so as to determine the point spread function.

In an embodiment, the blur image adjusting method includes the following steps. Firstly, a blur image in a YCbCr color space is obtained. The Y component of the blur image is extracted so as to obtain a Y component blur image. A blur area is extracted from the Y component blur image by an edge detection technology. A horizontal shift amount and a vertical shift amount are estimated according to a horizontal shift pixel number distribution and a vertical shift pixel number distribution of the blur area. A point spread function is determined according to the horizontal shift amount and the vertical shift amount. Afterwards, the blur image is adjusted according to the point spread function.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention relates to a blur image adjusting method. Hereinafter, the present invention is illustrated by referring to an image of Miss Lena as an object. The original sharp image undergoes a degradation process (vibration) to produce a blur image. After a point spread function is determined, a sharp image is recovered from the blur image by the point spread function and a restoration filter.

Hereinafter, the degradation/restoration process of the blur image adjusting method according to a preferred embodiment of the present invention will be illustrated with reference to FIGS. 2A-2G.

Figure 1A:
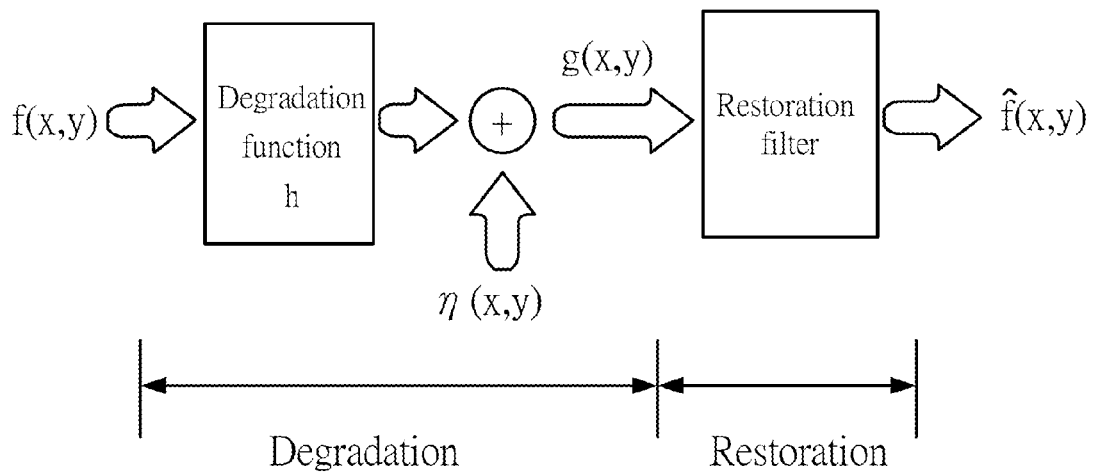
FIG. 1A schematically illustrates a model of an image degradation/restoration process.
Figure 1B:
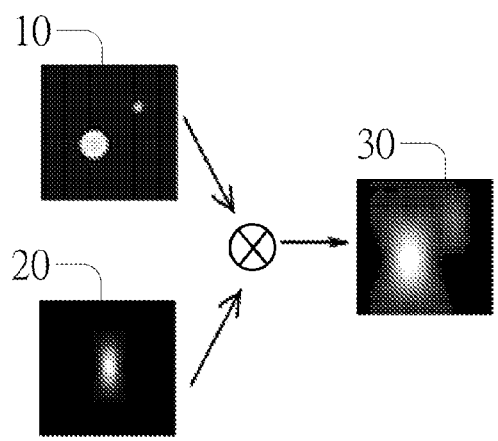
FIG. 1B schematically illustrates a degradation process of an object.
Figure 2A:
FIG. 2A schematically illustrates an original sharp image of Miss Lena.
Figure 2B:
FIG. 2B schematically illustrates a blur image generated in a case that the digital camera is subject to vibration during the shooting period.

As shown in FIG. 2A, an original sharp image of Miss Lena is shown. In a case that the digital camera is subject to vibration during the shooting period, a blur image as shown in FIG. 2B is received by the CCD of the digital camera.

Figure 2C:
FIG. 2C schematically illustrates a Y component blur image.

Next, a color space conversion is performed to convert the RGB color space into the YCbCr color space such that the RGB blur image is converted into a YCbCr blur image. In the YCbCr color space, Y is the luminance component, and Cb and Cr are the blue-difference and red-difference chroma components. In accordance with a key feature of the present invention, the Y component of the YCbCr blur image is used to detect the point spread function. In other words, only the luminance component of the blur image is taken into consideration but the chroma components are ignored. As shown in FIG. 2C, the Y component of the YCbCr blur image is also referred as a Y component blur image.

Figure 2D:
FIG. 2D schematically illustrates the blur area of an edged blur image obtained by an edge detection technology.

Next, an edge detection technology is used to detect the Y component blur image of FIG. 2C, thereby extracting the edges from the Y component blur image. Since the Y component blur image shown in FIG. 2C only contains the luminance component, the edges extracted by the edge detection technology are thick black lines of various aspect ratios and block blocks rather than clear thin black lines. The thick black lines of various aspect ratios and the black blocks constitute a blur area of the blur image, as is shown in FIG. 2D. As the vibration of the digital camera is more violent, the width of the edge line is larger. On the other hand, if the digital camera is suffered from no vibration, the width of the edge line becomes clearer. The edge detection technology used in the present invention is for example a Sobel edge detection technology, which is known in the art and not redundantly described herein.

Figure 2E:
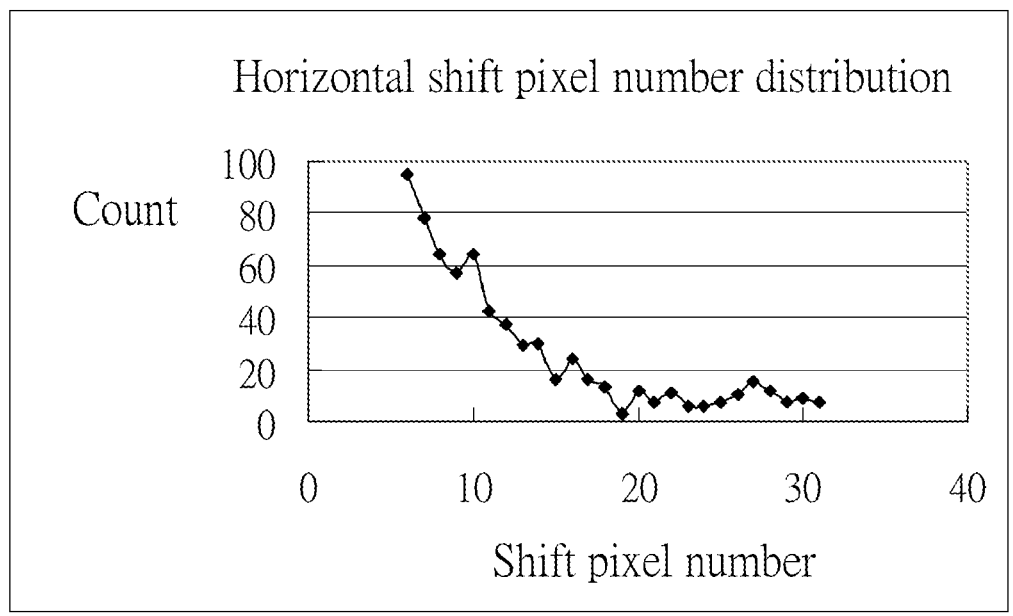
FIGS. 2E and 2F are schematic plots illustrating the variations of the counts with the horizontal shift pixel number and the vertical shift pixel number of the edged blur image shown in FIG. 2D, respectively.
Figure 2F:
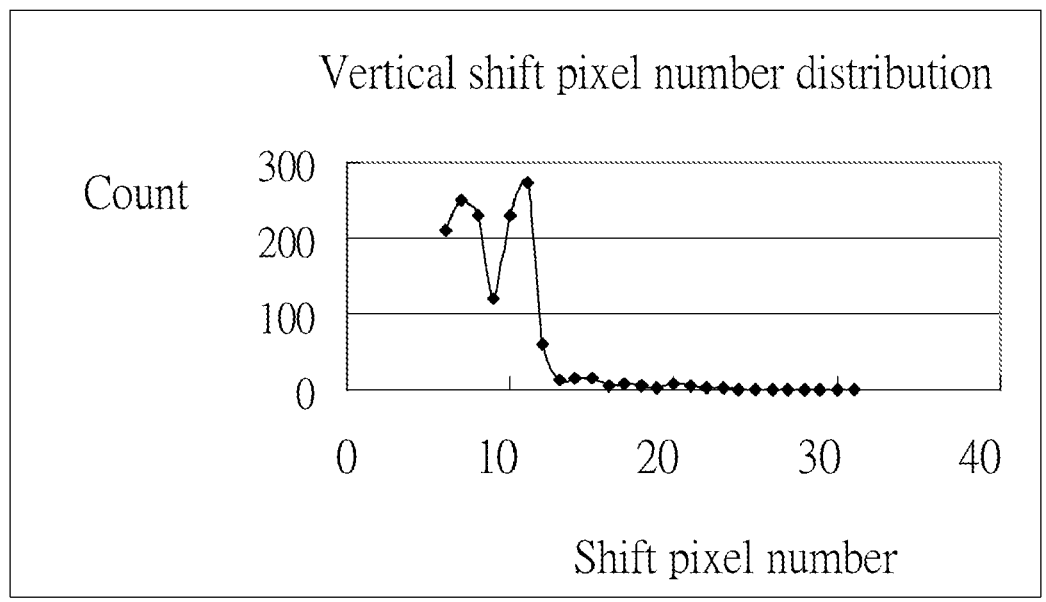

Next, the horizontal width and the vertical length associated with the thick black lines of various aspect ratios are measured in pixel unit. The occurrence counts for various horizontal shift pixel numbers (from left to right) and various vertical shift pixel numbers (from top to bottom) of the thick black lines contained in the edged blur image shown in FIG. 2D are plotted, thereby obtaining a horizontal shift pixel number distribution and a vertical shift pixel number distribution. FIG. 2E is a schematic curve plot illustrating the relation between the counts versus the horizontal shift pixel number of the edged blur image shown in FIG. 2D. As shown in FIG. 2E, the horizontal width of 6 pixels for the thick black lines of the blur area has the greatest occurrence (counts=95). Under this circumstance, the horizontal shift amount may be deemed as 6 pixels. FIG. 2F is a schematic curve plot illustrating the relation between the counts versus the vertical shift pixel number of the edged blur image shown in FIG. 2D. As shown in FIG. 2F, the vertical length of 11 pixels for the thick black lines of the blur area has the greatest occurrence (counts=272). Under this circumstance, the vertical shift amount may be deemed as 11 pixels.

Figure 2G:
FIG. 2G schematically illustrates a sharp image obtained by the blur image adjusting method of the present invention.

The results of FIGS. 2E and 2F indicate that a horizontal shift amount of 6 pixels and a vertical shift amount of 11 pixels are estimated when the digital camera is suffered from such vibration. Therefore, a point spread function having a horizontal shift amount of 6 pixels and a vertical shift amount of 11 pixels may be determined. After the point spread function is determined, a sharp image as shown in FIG. 2G is recovered from the blur image by the point spread function and a restoration filter (e.g. a Wiener filter).

Figure 3:
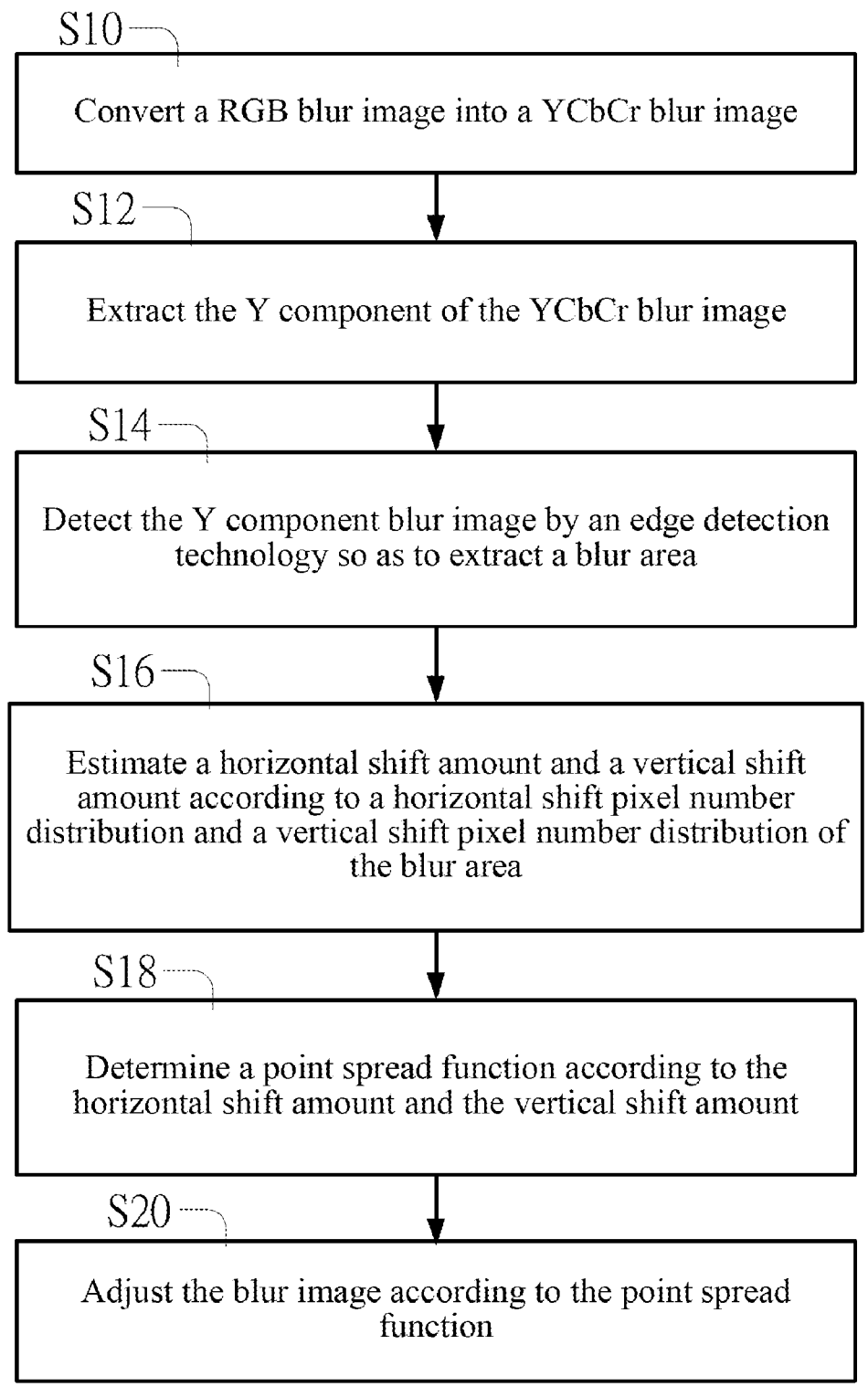
FIG. 3 is a flowchart of the blur image adjusting method according to a preferred embodiment of the present invention.

FIG. 3 is a flowchart of the blur image adjusting method according to a preferred embodiment of the present invention. First of all, a color space conversion is performed to convert the RGB color space into the YCbCr color space such that the RGB blur image is converted into a YCbCr blur image (Step S10). Next, the Y component of the YCbCr blur image is extracted so as to obtain a Y component blur image (Step S12). Next, an edge detection technology (e.g. Sobel edge detection technology) is used to detect the Y component blur image, thereby extracting a blur area from the Y component blur image (Step S14). Next, a horizontal shift amount and a vertical shift amount are estimated according to a horizontal shift pixel number distribution and a vertical shift pixel number distribution of the blur area (Step S16). Next, a point spread function is determined according to the horizontal shift amount and the vertical shift amount (Step S18). Afterwards, the blur image is adjusted according to the point spread function (Step 20). In other words, after the point spread function is determined, a restoration filter (e.g. a Wiener filter) may be designed according to the point spread function such that a sharp image is recovered from the blur image.

From the above description, the blur image adjusting method of the present invention can be applied to a handheld device having an anti-vibration function. By the point spread function determined according to the present invention along with a Wiener filter, a sharp image is recovered from the blur image. The blur image adjusting method of the present invention can be easily implemented by the processor of the handheld device without overloading the processor. In a case that the blur image adjusting method of the present invention is applied to a desktop computer processor, the point spread function determined according to the present invention and the Lucy-Richardson (LR) algorithm may be cooperated to recover a more sharp image from the blur image.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A blur image adjusting method, comprising steps of:
   obtaining a blur image in a YCbCr color space;
   extracting the Y component of the blur image so as to obtain a Y component blur image;
   extracting a blur area from the Y component blur image by an edge detection technology;
   estimating a horizontal shift amount and a vertical shift amount according to a horizontal shift pixel number distribution and a vertical shift pixel number distribution of the blur area;
   determining a point spread function according to the horizontal shift amount and the vertical shift amount; and
   adjusting the blur image according to the point spread function.

2. The blur image adjusting method according to claim 1 further comprising a step of converting the blur image in a RGB color space into the blur image in the YCbCr color space before the blur image in the YCbCr color space is obtained.

3. The blur image adjusting method according to claim 1 wherein the edge detection technology is a Sobel edge detection technology.

4. The blur image adjusting method according to claim 1 wherein the horizontal shift pixel number distribution indicates occurrence count of various horizontal shift pixel numbers of whole black lines contained in the blur area from left to right.

5. The blur image adjusting method according to claim 1 wherein the vertical shift pixel number distribution indicates occurrence count of various vertical shift pixel numbers of whole black lines contained in the blur area from top to bottom.

6. The blur image adjusting method according to claim 1 wherein the step of adjusting the blur image according to the point spread function includes designing a restoration filter according to the point spread function, thereby recovering a sharp image from the blur image.

7. The blur image adjusting method according to claim 6 wherein the restoration filter is designed by using a Lucy-Richardson algorithm.

8. The blur image adjusting method according to claim 6 wherein the restoration filter is a Wiener filter.

9. The blur image adjusting method according to claim 1 wherein the blur image is captured by a charge coupled device.

* * * * *